United States Patent Office 3,290,017
Patented Dec. 6, 1966

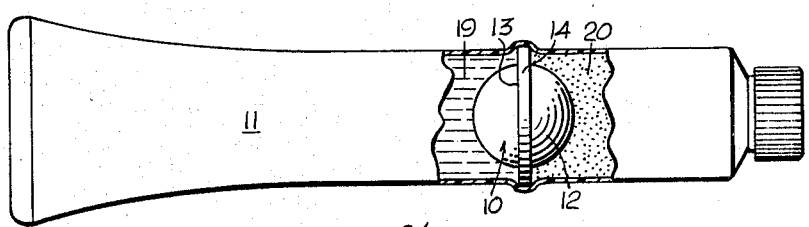
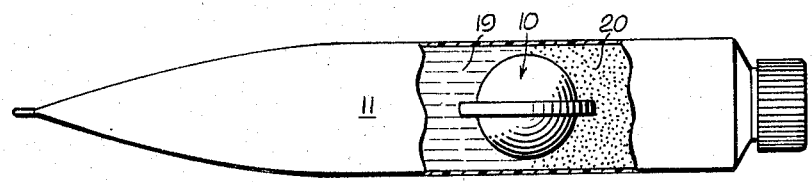
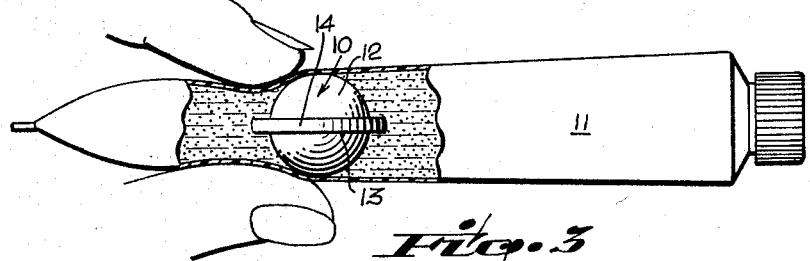
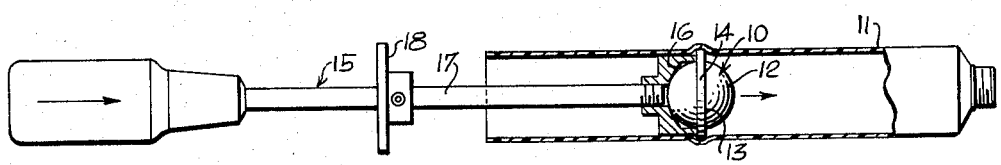
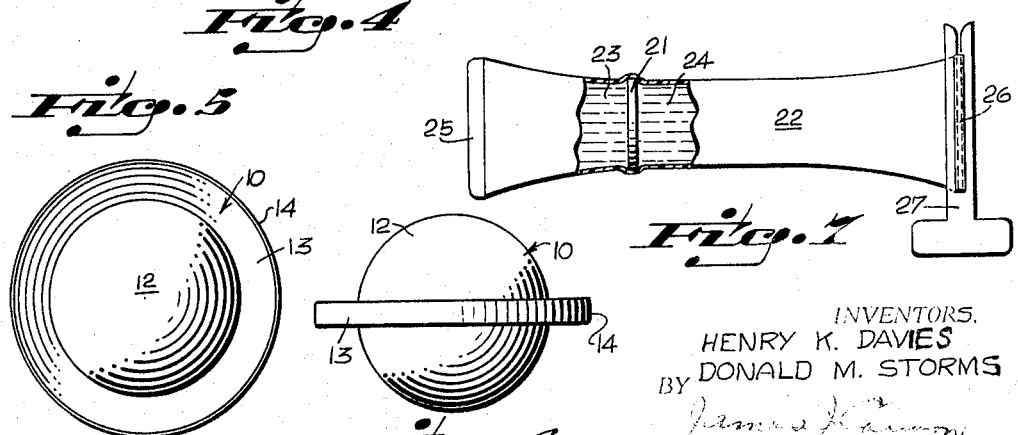
INVENTORS.
HENRY K. DAVIES
DONALD M. STORMS
BY
ATTORNEY.

3,290,017
BARRIER-MIXER FOR TUBULAR CONTAINERS
Henry K. Davies, 203 Heights Road, Ridgewood, N.J., and Donald M. Storms, 371 Dorothy Lane, Wyckoff, N.J.
Filed Oct. 1, 1964, Ser. No. 400,646
6 Claims. (Cl. 259—114)

This invention relates generally to partitioned containers for storing a plurality of different ingredients that must be kept separated until ready for use as a mixture or compound, and is directed particularly to a barrier-mixer for use with a container in the form of a plastic tube or cylinder, and which serves, firstly, as a barrier dividing the interior of the tube into two separate chambers, and, secondly, as a device manipulated from the outside of the tubing for thoroughly mixing the ingredients contained in the separated chambers just prior to use.

Devices for storing and mixing two or more ingredients that must be kept separate until just before dispensing in thoroughly mixed condition are known. Examples of such two-ingredient mixtures or compounds are medicaments in granular form that must be made solvent only just before use by mixture with a liquid, bonding agents such as epoxy resin wherein a catalyst must be mixed with the resin, cosmetic hair-dressing preparations, and food products such as sandwich spreads and the like comprised of two ingredients that must be kept separated until just before use. Such containers as have heretobefore been devised, however, are either of complex mechanical structure including reciprocable plungers, ram rods and the like for mixing operation or ineffective for thorough mixing of the ingredients prior to dispensing. Another disadvantage of prior devices resides in the fact that, with the plunger type mixers, leakage often occurred at the plunger rod seal, thereby soiling the hands and, in the case of repeated use with certain chemicals or ingredients, causing dermatitis and other skin disorders.

It is accordingly the principal object of this invention to provide a simple, efficient and inexpensive barrier-mixer for use in compartmented containers that overcomes the above-described deficiencies in storage-mixer devices heretofore provided.

It is a more particular object to provide, in a device of the character described, a barrier-mixer in the form of a circular disc for axially adjustable transverse placement as a barrier in a thin-walled, resilient, tubular container of slightly lesser internal diameter to divide the container into two compartments for the separate storage of two ingredients of a mixture to be subsequently dispensed in mixed form, the disc being provided with smooth protrusions at each side which can readily be manipulated through the tubing for moving the mixer-barrier back and forth in the tubular container to mix the ingredients after the barrier has been angularly displaced from its transverse partioning position.

Other objects, features and advantages of the invention will be apparent from the following description when read with reference to the accompanying drawings. In the drawings, wherein like reference numerals denote corresponding parts throughout the several views:

FIG. 1 illustrates, partly in section, a barrier-mixer embodying the invention shown in use in dividing a tubular, screw-cap container into two compartments for the separate storage of two ingredients subsequently to be dispensed as a mixture or compound;

FIG. 2 illustrates the device of FIG. 1 with the barrier-mixer angularly displaced from its lateral dividing position preparatory to mixing of the ingredients;

FIG. 3 is a view similar to FIGS. 1 and 2 showing how the barrier-mixer is manually moved back and forth in its resilient tubular container for mixing the ingredients just prior to dispensing;

FIG. 4 illustrates the use of a hand tool for positioning a barrier-mixer in a tubular container;

FIG. 5 is a plan view, on an enlarged scale, of the barrier-mixer shown separately;

FIG. 6 is an elevational view thereof; and

FIG. 7 illustrates an alternative form of the invention for use with low viscosity liquids.

Referring now in detail to the drawings, 10 in FIGS. 1, 2 and 3 designates a barrier-mixer member shown in use in association with a resilient, thin-walled, tubular screw-cap container 11. As best illustrated in FIGS. 5 and 6, the barrier-mixer member 10, which, while it could be of metal, is preferably of a cast phenolic resin synthetic plastic material ground to finished shape, comprises a spherical body portion 12 integrally formed with a flat, diametrical annulus 13 of substantially increased diameter, the peripheral edge of which is gently rounded, as indicated at 14. The screw-cap container or tube 11 is of a thin-walled, resilient, synthetic plastic material, and is of somewhat lesser internal diameter than the peripheral diameter of the barrier-mixer annulus 13 so that, when the barrier-mixer is placed in laterally-extending position within said container as illustrated in FIG. 1, an annular zone of the inner wall thereof will be stretched into closely embracing relation over the rounded peripheral edge of the annulus edge 14 to divide the container into two separate compartments. As illustrated by way of example in FIG. 1, a hand tool 15 having a cup 16 at one end of a push rod 17 for properly supporting a barrier-mixer member 10 can be used for locating the barrier-mixer through the open end of a tubular container 11 prior to filling of the compartments and sealing off of the bottom of the tube. An adjustably-positioned collar 18 on the push rod 17 can be used for automatically fixing the axial position of the barrier-mixer in the tube by abutment therewith of the lower end of the tube, to provide the compartment size relationship required for the particular ingredients to be contained for storage.

In use, FIG. 2 illustrates the barrier-mixer member 10 displaced from its dividing position just prior to mixing of the separate ingredients, indicated at 19 and 20 in FIGS. 1 and 2. This displacement can readily be effected by pushing the annulus 13 from each side through the container with the thumb and forefinger to tip said annulus in the axial direction, as illustrated. The loose barrier-mixer can then be pushed back and forth in the tube, as illustrated in FIG. 3, to mix the ingredients just prior to dispensing through the neck of the tube. The spherical body portion 12 of the barrier-mixer 10 not only provides smooth surface portions facilitating the movement thereof along the tube in mixing, but also serves to restrict the passage opening communicating between each side thereof for a more forceful mixing of the ingredients.

FIG. 7 illustrates a modification of the invention for use when the separated ingredients are liquids of low viscosity, which will readily mix without any substantial agitation. This embodiment differs only in that, while it comprises a barrier member 21 in the form of a disc which may have the same thickness, outer diameter, and rounded peripheral edge of that of the above-described barrier-mixer 10, it lacks the spherical body portion 12 thereof. As illustrated in FIG. 7, the barrier member 21 is located in a plastic tube 22 dividing it into compartments containing, by way of example, low vicosity liquids indicated at 23 and 24, both ends of said tube being flattened and sealed as indicated at 25 and 26. In use, the barrier member 21 will be manually dislodged and the tube then squeezed along its length for a sufficient length of time to thoroughly mix the two liquids, after which either end of the tube can be appropriately cut to dispense the mixed contents. As is further illustrated in FIG. 7, a slotted key 28 can be used at the closed end of the tube to facilitate rolling up thereof in dispensing of the contents.

While there is described and illustrated herein only two forms in which the invention can conveniently be embodied in practice, it is understood that these forms are presented by way of example only, and not in a limiting sense. The invention, in brief, comprises all the embodiments and modifications coming within the scope and spirit of the following claims.

What we claim as new and desire to secure by Letters Patent is:

1. A barrier-mixer device comprising, in combination, a spherical body portion, an annulus integrally formed with said body portion and providing a continuous peripheral edge surrounding said body portion, and a tubular container, said container having a resilient wall structure, the peripheral length along the inside wall of said container at a transverse section thereof being somewhat lesser than the peripheral length along the edge of said annulus, said annulus being transversely positioned in said tubular container.

2. A barrier-mixer device as defined in claim 1 wherein the peripheral edge of said annulus is convexly rounded.

3. A barrier-mixer device comprising, in combination, a tubular container, a mixing device in said container including a central spherical portion and a circumferential annulus integraly formed therewith providing a continuous peripheral edge surrounding said spherical portion, said annulus having an outer diameter greater than the internal diameter in said container.

4. A barrier-mixer member as defined in claim 3, wherein the peripheral edge of said annulus is convexly rounded.

5. A barrier-mixer device comprising, in combination, a tubular container, a mixing device in said container, said device including a spherical member having a circular annulus integrally formed therewith and providing a continuous peripheral edge surrounding said spherical member, said container having a resilient wall structure, the internal diameter of said container being somewhat lesser than the outer diameter of said annulus, said annulus being transversely positioned in said tubular container.

6. A barrier-mixer device comprising, in combination, a tubular container, a mixing device therein, said device including a central spherical portion surrounded by a circular annulus having a concavely rounded peripheral edge, said container having a resilient wall structure, the internal diameter of said container being somewhat lesser than the outer diameter of said annulus, said mixing device being transversely positioned in said tubular container.

References Cited by the Examiner

UNITED STATES PATENTS

| | | | |
|---|---|---|---|
| 2,176,923 | 10/1939 | Nitardy | 222—94 |
| 2,527,992 | 10/1950 | Greenberg | 259—72 |
| 2,668,307 | 2/1954 | Preen | 15—104.06 |
| 2,880,913 | 4/1959 | Peyron | 222—386 |
| 3,006,396 | 10/1961 | Cushman | 150—.5 |
| 3,055,540 | 9/1962 | Ringlen | 150—.5 |

WALTER A. SCHEEL, *Primary Examiner.*

R. W. JENKINS, *Assistant Examiner.*